United States Patent [19]
Hoskins et al.

[11] Patent Number: 5,444,619
[45] Date of Patent: Aug. 22, 1995

[54] SYSTEM AND METHOD OF PREDICTING RESERVOIR PROPERTIES

[75] Inventors: Josiah C. Hoskins, Mequon, Wis.; Joshua M. Ronen, West Sussex, United Kingdom

[73] Assignee: Schlumberger Technology Corporation, Austin, Tex.

[21] Appl. No.: 128,069

[22] Filed: Sep. 27, 1993

[51] Int. Cl.$^6$ .................. G01V 1/00; G06F 15/336
[52] U.S. Cl. ................................ 364/421; 382/159
[58] Field of Search ............... 364/421, 422; 395/20, 395/21, 22, 23, 921; 382/43

[56] References Cited

U.S. PATENT DOCUMENTS

| | | | |
|---|---|---|---|
| 5,107,442 | 4/1992 | Weideman | 395/11 |
| 5,113,483 | 5/1992 | Keeler et al. | 395/23 |
| 5,129,040 | 7/1992 | Hanazato et al. | 295/25 |
| 5,134,685 | 7/1992 | Rosenbluth | 395/21 |
| 5,181,171 | 1/1993 | McCormack et al. | 364/421 |
| 5,265,192 | 11/1993 | McCormack | 395/422 |

OTHER PUBLICATIONS

Brown, A. R., Wright, R. M., Burkart, K. D., and Abriel, W. L., 1984. Interactive seismic mappping of net producible gas sand in the gulf of Mexico. *Geophysics* 49, 686–714.

Marion, D., Nur, A., Yin, H., and Han, D., 1992. Compressional velocity and porosity in sand-clay mixtures. *Geophysics* 57, 554–563.

Moody, J., and Darken, C., 1989. Fast Learning in Networks of Locally-Tuned Processing Units. *Neural Computation* 1, 281–294.

Ronen, S., Hattori, M., Geoltrain, S., and Schultz, P., 1992. Lateral Prediction of Reservoir Properties using Seismic Attributes and Well Log Data. *Proceedings of 54th Meeting and Technical Exhibition*, European Association of Exploration Geophysicists, Paris France.

Sonneland, L., Barkved, O., and Hagenes, O., 1990. Construction and Interpretation of Seismic Classifier Maps. *Proceedings of 52nd Meeting and Technical Exhibition*, European Association of Exploration Geophysicists, Copenhagen, Denmark.

Taner, M. T., Koehler, F., and Sheriff, R. E., 1979. Complex seismic trace analysis, *Geophysics* 44, 1041–1063.

Akbar, N., Dvorkin, J., and Nur, A. 1993. Relating P-wave Attenuation to Permeability, *Geophysics*, 58, 20–29.

*Primary Examiner*—Gail O. Hayes
*Assistant Examiner*—Khai Tran
*Attorney, Agent, or Firm*—Charles D. Huston

[57] ABSTRACT

A system and method for predicting oil reservoir properties throughout the reservoir using well data and seismic data. While the reservoir properties in the vicinity of a well borehole are usually known (i.e. by well logging), the reservoir properties between wells are unknown and difficult to estimate. Because the relationships between reservoir properties and seismic data is seldom obvious, the method uses Artificial Neural Networks (ANN's) to estimate these relationships. First, the method calculates the intersections between the seismic data and wellbore date, i.e. seismic reflectors are correlated to geological markers in the wellbores. Second, the method estimates the significance between seismic attributes and borehole properties. Next, the method models or calibrates the relationship between reservoir properties and seismic attributes by training an ANN using seismic attributes and wellbore data close to the intersections. Finally, the trained ANN uses the seismic attributes to predict the reservoir properties between wells. Advantageously, statistic methods are used to estimate the confidence of the predictions.

20 Claims, 16 Drawing Sheets

|  | AcousticImpedance | VolumeOfClay | WaterSaturation | TrueDip | DipAzimuth | THICKNESS | Porosity |
|---|---|---|---|---|---|---|---|
| Avg_Acoustic_Impedance | 75.26 | 66.69 | 80.58 | 63.16 | 45.12 | 13.12 | 80.58 |
| DEPTH | 86.30 | 5.65 | 89.66 | 45.12 | 63.16 | 56.40 | 85.01 |
| Amplitude | 47.21 | 47.78 | 39.93 | 45.12 | 0.00 | 13.12 | 47.21 |
| ReflectionHeterogenity | 16.82 | 13.12 | 13.12 | 45.12 | 45.12 | 34.62 | 1.88 |
| ReflectionIntensity | 24.11 | 50.64 | 56.40 | 45.12 | 45.12 | 27.67 | 44.49 |
| InstantaneousFrequency | 56.40 | 71.19 | 44.49 | 0.00 | 45.12 | 41.28 | 44.49 |
| TimeDip | 66.69 | 50.64 | 44.49 | 0.00 | 45.12 | 5.65 | 66.69 |
| Azimuth | 50.64 | 24.11 | 37.99 | 0.00 | 0.00 | 13.12 | 50.64 |

Fig. 3

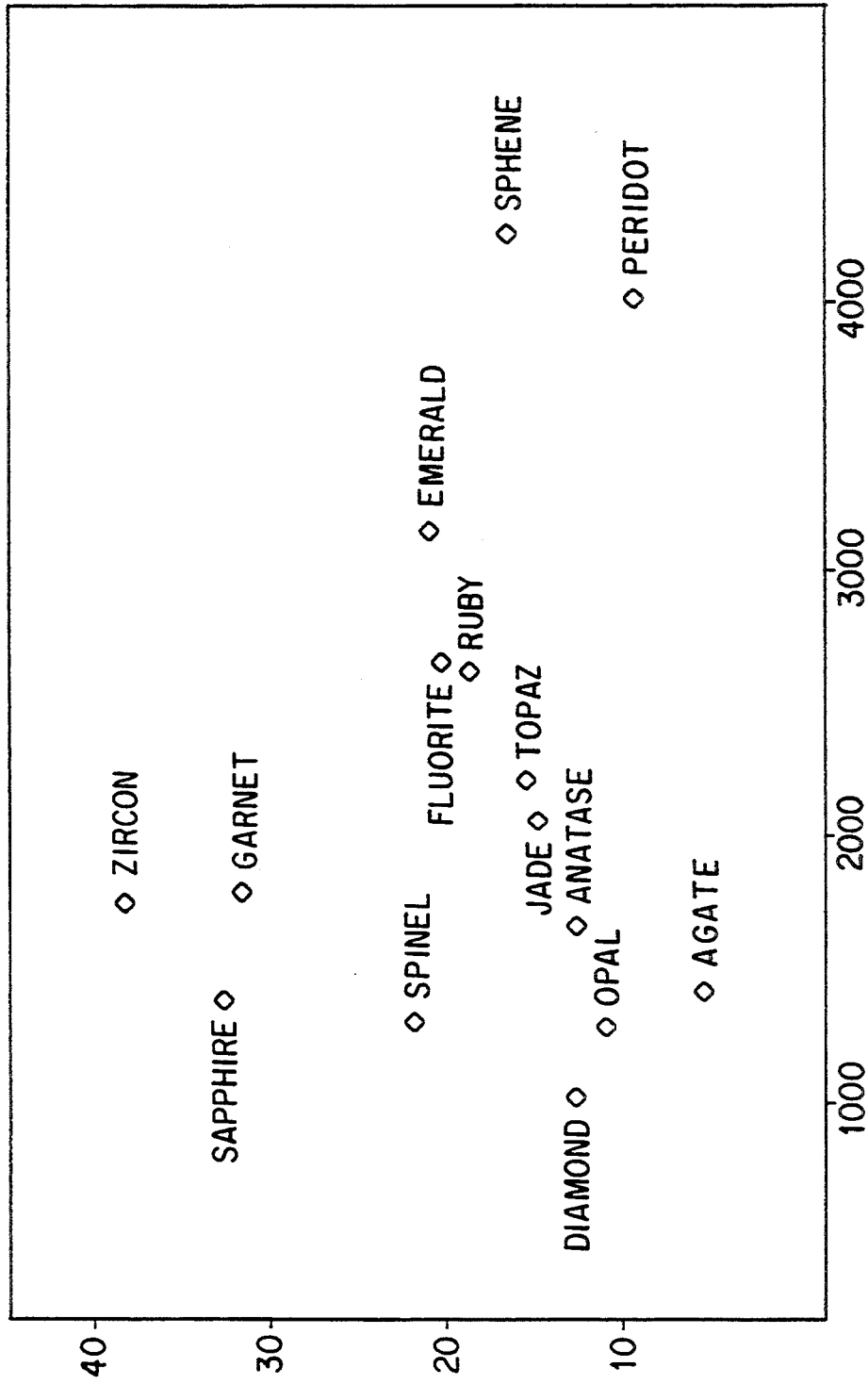

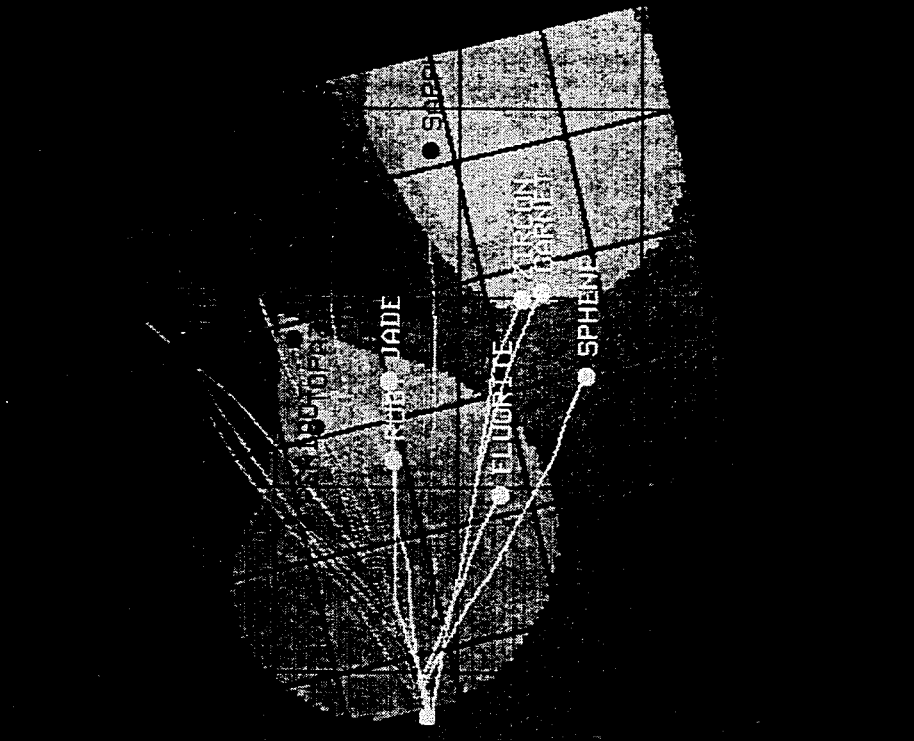
Fig. 12

SYSTEM AND METHOD OF PREDICTING RESERVOIR PROPERTIES

TECHNICAL FIELD

This invention relates to a method of predicting oil reservoir properties using seismic data and wellbore data. In particular, the invention predicts reservoir properties, such as porosity or water saturation, between oil wells using an Artificial Neural Network trained by statistically significant, matched seismic attributes and wellbore data.

BACKGROUND OF THE INVENTION

1. Reservoir Modeling

Seismic data are routinely and effectively used to estimate the structure of reservoir bodies, but often play no role in the essential task of estimating the spatial distribution of reservoir properties. Reservoir property mapping is usually based solely on wellbore data, even when high resolution 3D seismic data are available. "Wellbore data" includes information typically obtained from a wireline log or core sample from an oil well and is typically the desired fine grain information for characterizing a "reservoir property."

Porosity, permeability, fluid and gas saturation, and other reservoir properties are measured at high accuracy near oil wells (e.g. by wireline logs), but these data do not assure reliable estimates of reservoir properties away from the wells. Seismic waves are not limited to wells, and seismic data may contain useful information about reservoir properties between the wells.

Processing of seismic data produces "seismic attributes" which may be effectively used to delineate the structure. See e.g., M. T. Taner, F. Koehler, and R. E. Sheriff, 1979, Complex Trace Analysis, *Geophysics* 44,1041–1063 and L. Sonneland, O. Barkved, and O. Hagness, 1990, Construction and Interpretation of Seismic Classifier Maps, EAEG meeting in Copenhagen. Seismic attributes are mathematical transformations on the data, computed either poststack (e.g., reflection intensity, instantaneous frequency, acoustic impedance, dip, azimuth) or prestack (e.g., AVO or moveout parameters). Well data are not used in their computation: attributes are purely properties of the seismic data alone. Otherwise, any analysis of the significance of seismic attributes to reservoir properties will be frustrated. Other seismic attributes include: acoustic impedance and velocity; reflection heterogeneity and instantaneous frequency; depth; dip and azimuth.

Specific seismic attributes may be related to specific reservoir properties. For example, acoustic impedance estimated from reflectivity by inversion of seismic data is an important seismic attribute. FIG. 13, shows cross sections of seismic data—reflectivity and acoustic impedance, together with wellbore data—porosity and water saturation. From FIG. 13, porosity does not appear directly related to the reflectivity, but it seems related to acoustic impedance—high impedance seems to imply low porosity. However, it is unclear how to actually use acoustic impedance to estimate porosity.

One problem in using seismic attributes is that their relation to rock properties is not obvious. For example, it is unclear how to use AVO to estimate gas saturation. Even if estimates are made, the confidence level in such estimates are unknown. There are unknown local factors that may affect the data in unexpected ways, and it is risky to predict functional relationships among seismic attributes and reservoir properties based on a simplified theoretical analysis with no familiarity of what "works" in a certain region. Region familiarity is built by comparing seismic and wellbore data. There is a need for interpretation methods and tools to build region familiarity, quantify its reliability, and subsequently use it to estimate properties. There is a need for a method to identify statistically-significant associations of seismic attributes and reservoir properties in any area, to determine the functional relationships implicit in these associations, to use them to predict the distribution of reservoir properties, and to quantify the reliability of the estimates.

2. Artificial Neural Networks

A great deal of recent research has been published relating to the application of artificial neural networks in a variety of contexts. See, for example, U.S. Pat. Nos. 5,134,685, 5,129,040, 5,113,483, and 5,107,442 (incorporated by reference). Artificial neural networks are computational models inspired by the architecture of the human brain. As a result three constraints are usually imposed on these models. The computations must be performed in parallel, the representation must be distributed, and the adjustment of network parameters (i.e., learning) must be adaptive. From an engineering perspective ANNs are adaptive, model-free estimators that estimate numerical functions using example data. While many different types of artificial neural networks exist, two common types are radial basis function (RBF) and back propagation artificial neural networks.

SUMMARY OF THE INVENTION

The problems outlined above associated with predicting petroleum reservoir properties between wells is largely solved by the system and method of the present invention. That is, the present invention uses the simultaneous analysis of seismic data with wellbore data to better estimate the reservoir properties. The method identifies statistical correlations between seismic data and wellbore data, estimates the nonlinear functional relationships between seismic attributes and wellbore data using Artificial Neural Networks, and uses the functional relationships or "matches" to map reservoir properties between oil wells guided by the seismic data. An important additional result is the confidence level estimation of the reservoir property prediction.

In more detail, the method of the present invention for predicting oil reservoir properties uses multiple types of seismic data and multiple types of wellbore data for one or more oil wells in the reservoir. As used herein, "seismic data" may include any type of seismic information, but specifically includes processed information called "seismic attributes." First, the method relates the seismic data to the wellbore data for at least one of the oil wells to determine the approximate intersections of the seismic and wellbore data. That is, the seismic data has to be calibrated or correctly correlated by depth to the wellbore data. Next, the method estimates the significance of a match between one or more types of seismic data to a type of wellbore data using the intersections. That is, some of the types of seismic data and wellbore data show statistical correlation or matches while others are only randomly related.

Next, the method models or calibrates the relationship between seismic data and wellbore data by training an Artificial Neural Network (ANN) using one or more of the nonrandom matches. Where the match between seismic data and wellbore data is linearly related, resort to ANN analysis is not necessary. However, the important matches of interest are often nonlinearly related by a complex and usually unknown function and use of ANN's makes calibration possible or at least simplifies calibration. Finally, the reservoir property is calculated using the trained ANN based on the seismic data. As an additional step, the confidence level of the calculated reservoir property can be estimated.

Preferably, the seismic data is a seismic attribute, such as acoustic velocity, acoustic computing, or amplitude versus offset (AVO). Preferably, the wellbore data is obtained by a wireline log or core sample such as porosity, water saturation, or permeability. In a preferred form a plurality of seismic attributes are input to the trained ANN and a reservoir property output.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

FIG. 3 is a table of significant values of seismic attributes and reservoir properties;

FIG. 9(a) is guided by depth in accordance with the present invention and 9(b) is without seismic guidance;

FIG. 10 is a graph of thickness versus amplitude;

FIG. 12 is a pair of graphs depicting reservoir porosity predictions with seismic guidance (left-hand side) and without seismic guidance (right-hand side)

DESCRIPTION OF THE PREFERRED EMBODIMENTS

1. General Description

The simultaneous analysis of seismic attributes with wellbore data from multiple wells leads to better predictions of reservoir properties. Such seismic guided predictions have higher resolution and predict reservoir properties with higher accuracy, compared to estimates based on well data in which the seismic data were used only for the geometry. For example, when acoustic impedance inverted from seismic data is used to guide the estimate of porosity using the method of the present invention, the error is cut in half as compared to conventional methods.

The method identifies statistical correlations between seismic attributes and log properties, estimates linear or nonlinear functional relationships between attributes and properties, uses artificial neural networks for analyzing complex nonlinear relationships, and using these functional relationships and geostatistical technics to predict reservoir properties.

Based on rock physics, certain seismic attributes are indicative of certain reservoir properties. However, exact functional relationships from theory is unreliable, and a learning phase is therefore valuable in every new reservoir context. Examples of known correlations of reservoir properties related to seismic attributes include porosity guided by acoustic impedance, velocity, and volume of clay; volume of clay and dolomite guided by heterogeneity and instantaneous frequency; water saturation guided by depth; thickness guided by amplitude. Also, borehole measured dip and azimuth are compared to dip and azimuth inferred from tracking seismic reflections.

2. Detailed Description

Figure 1:
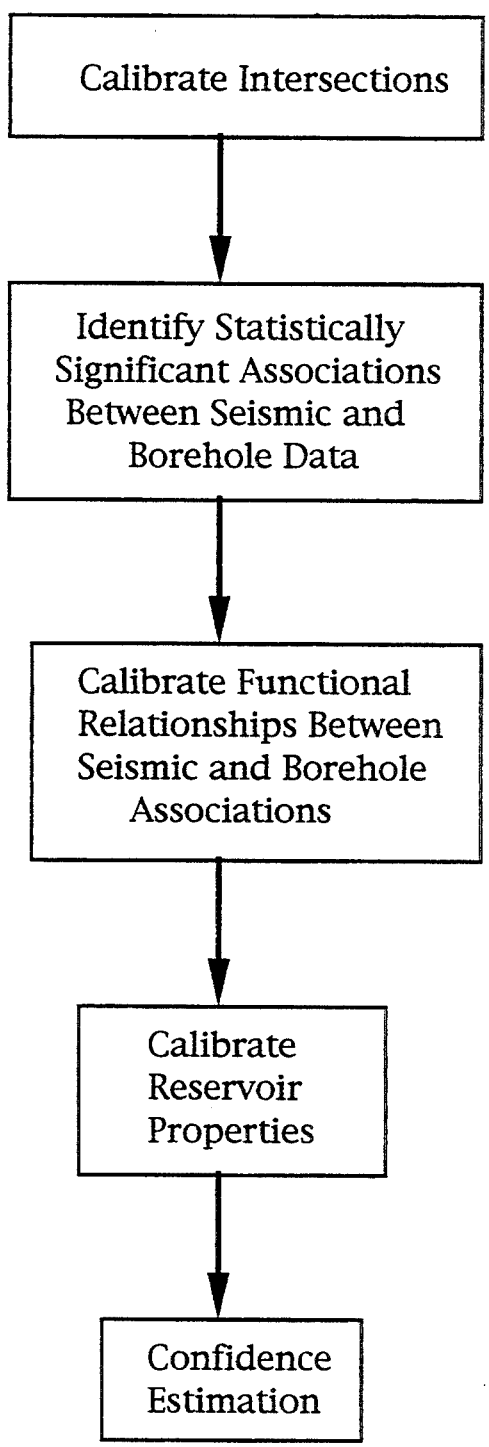
FIG. 1 is a flow chart depicting an overview of the method of the present invention.

The 5 principle steps in the method of the present invention are illustrated in FIG. 1 and are as follows.

1) Calculating and editing intersections

Figure 2:
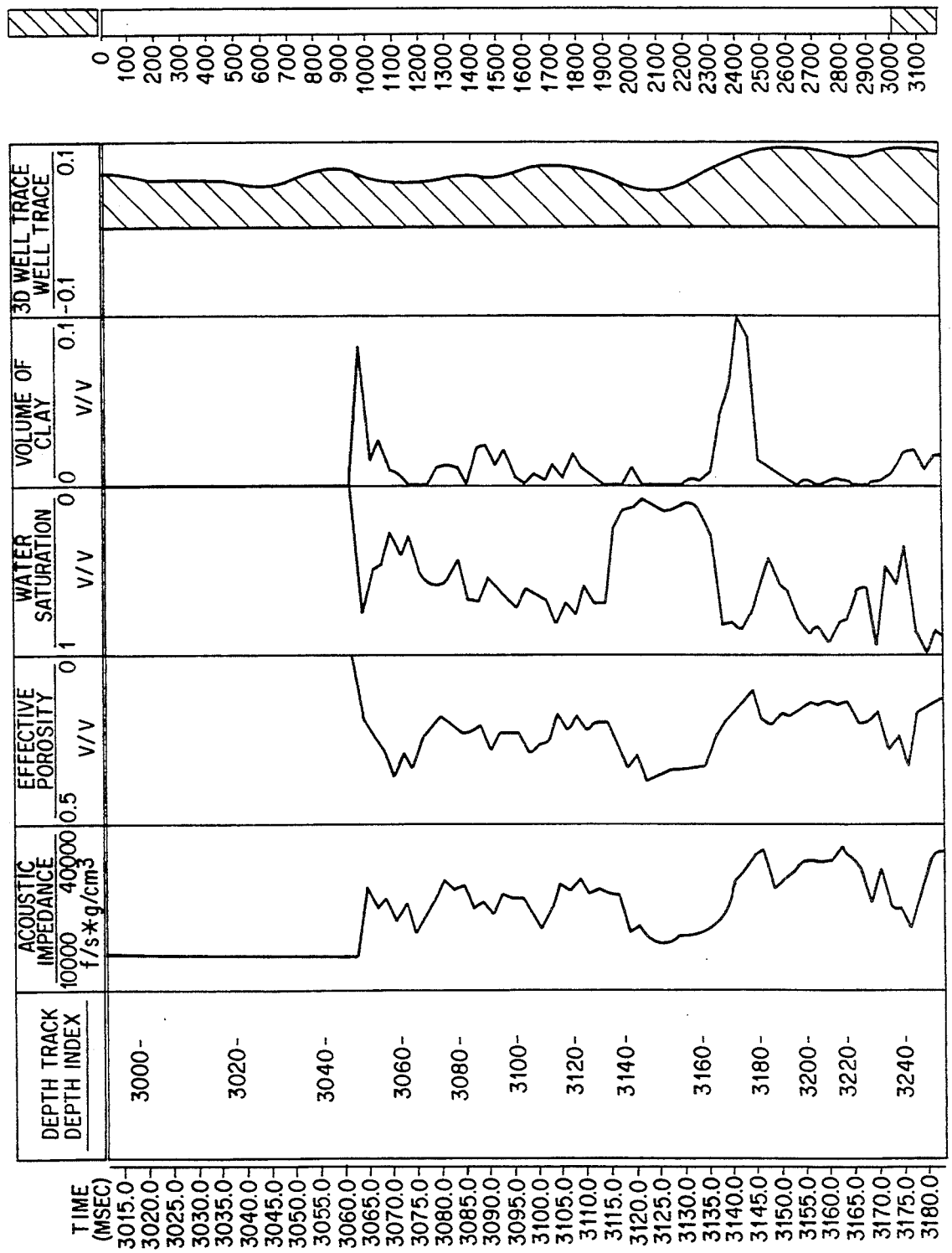
FIG. 2 is a graph of a single well comparing various log properties and a seismic well trace.

Seismic data are measured in time, well data in depth and it is important that the seismic data be related or calibrated in physical space to the wellbore data. Relating seismic reflectors to geological markers seen in boreholes is a critical step; inaccuracy of a few meters may completely change subsequent results. The analysis is based on synthetic seismograms and time to depth conversion based on a velocity model. Eventually, the intersections may be refined interactively. FIG. 2 displays a single well view of well logs and acoustic impedance extracted from the seismic data along the well. It is necessary to tie control points in depth (called geological markers) to control points in time (called seismic markers). As can be seen from FIG. 2 adjustment of the acoustic impedance to match up with well logs is possible.

In more detail, FIG. 2 shows a single well display with various logs and a seismic well trace plotted as a function of time and depth. The acoustic impedance log (first on the left) is very similar to the porosity log (second on the left) and quite similar to the acoustic impedance inverted from surface seismic data with no usage of well data in the inversion. The well trace is displayed in variable area on the right. It contains values from a 3-D acoustic impedance cube extracted on the trajectory of a deviated well. The acoustic impedance trace resembles the acoustic impedance log, except that it has a lower frequency content. One can identify the high porosity—low acoustic impedance component on both logs and well trace. This is further indication that acoustic impedance from inversion might be useful to estimate porosity. The volume of clay log (fourth log from left) does not resemble the well trace. Hence, inverted impedance would not be directly useful for estimation of shaliness.

The resolution of well data is higher than that of surface seismic data. To use them together effectively, appropriate averaging is done at the intersections. The well data are averaged between the top and bottom of a geological component (layer). The seismic attributes are averaged temporally and spatially to isolate the influence of the geological component.

2) Significance estimation (quality matrix)

Wellbore data from multiple wells are extracted at horizon intersections to give a multidimensional scatter of independent values. In the case of mapping averaged properties within layers, each well contributes a point to this scatter. The purpose of significance estimation is to quantify which attributes are significant to which properties—i.e., a match between seismic attributes and wellbore data. For each match, the method calculates the probability of the values not being randomly related. Preferably, the Kendall tau indicator, $\tau_k$, which is a measure of the monotonicity of a scatter, is used. See, M. Kendall, and A. Stuart, 1977, The Advanced Theory of Statistics, 4th ed., Griffin & Co., London. It detects nonlinear relations, as opposed to other indicators which measure how close a relation is to being linear. Another advantage is that it is a robust indicator which is not easily affected by a few erroneous measurements, much like the median is more robust than the mean. The significance is the probability of the scatter not being random. It is calculated from the actual $\tau_k$ and the number of points in the scatter, N, as the probability of having a $\tau_k$ smaller than the actual one with N random points.

Each pair of points in a scatter has a slope. If there are N points in the scatter, there are a total of $N_T = N(N-1)/2$ slopes. Kendall's $\tau$ is defined as, $$\tau_k = \frac{N_P - N_N}{\sqrt{(N_T - N_\infty) \cdot (N_T - N_Z)}}$$

where $N_P$, $N_N$, $N_Z$, and $N_\infty$ are the numbers of positive, negative, zero, and infinite slopes. If all the slopes have the same sign, the scatter is monotonous and the absolute value of $\tau_k$ is 1. If there are as many negative as there are positive slopes, $\tau_k$ will be 0. If all the slopes are either zero or infinite, $\tau_k$ will be undetermined. $\tau_k$ can never exceed 1.0 in absolute value.

By itself, $\tau_k$ is not a significance estimator. For example, with two points the absolute value of $\tau_k$ is (almost always) the highest possible 1, but the significance should be zero. The significance is estimated from a given $\tau_k$ and the number of points, N, according to the probability of getting the particular $\tau_k$ from N random points. Based on Kendall and Stuart analysis, $$\text{Significance} = \text{erf}\left(0.477 \, \tau_k \sqrt{\frac{9N(N-1)}{(8N+20)}}\right)$$

(for N>4). This gives, for example, 44% for $\tau_k$ of 0.5 with 5 points, but 84% for $\tau_k$ of just 0.2 with 100 points.

The significance values are summarized in a quality matrix (FIG. 3). The columns correspond to reservoir properties and the rows to seismic attributes. Previously estimated properties can be loaded as if they were seismic attributes. It is essential to examine the scatters of attribute-property pairs directly, and to disable outlier points that we wish to exclude from the analysis. FIG. 3 depicts the "Quality Matrix" or significance values useful for determining matches between seismic attributes and reservoir properties. The significance values of each seismic attribute and reservoir property are displayed on buttons, from which a cross plot editor can be popped. For example, Acoustic impedance is significant for porosity, depth for water saturation, and Instantaneous Frequency for Volume of Clay.

Figure 4A:
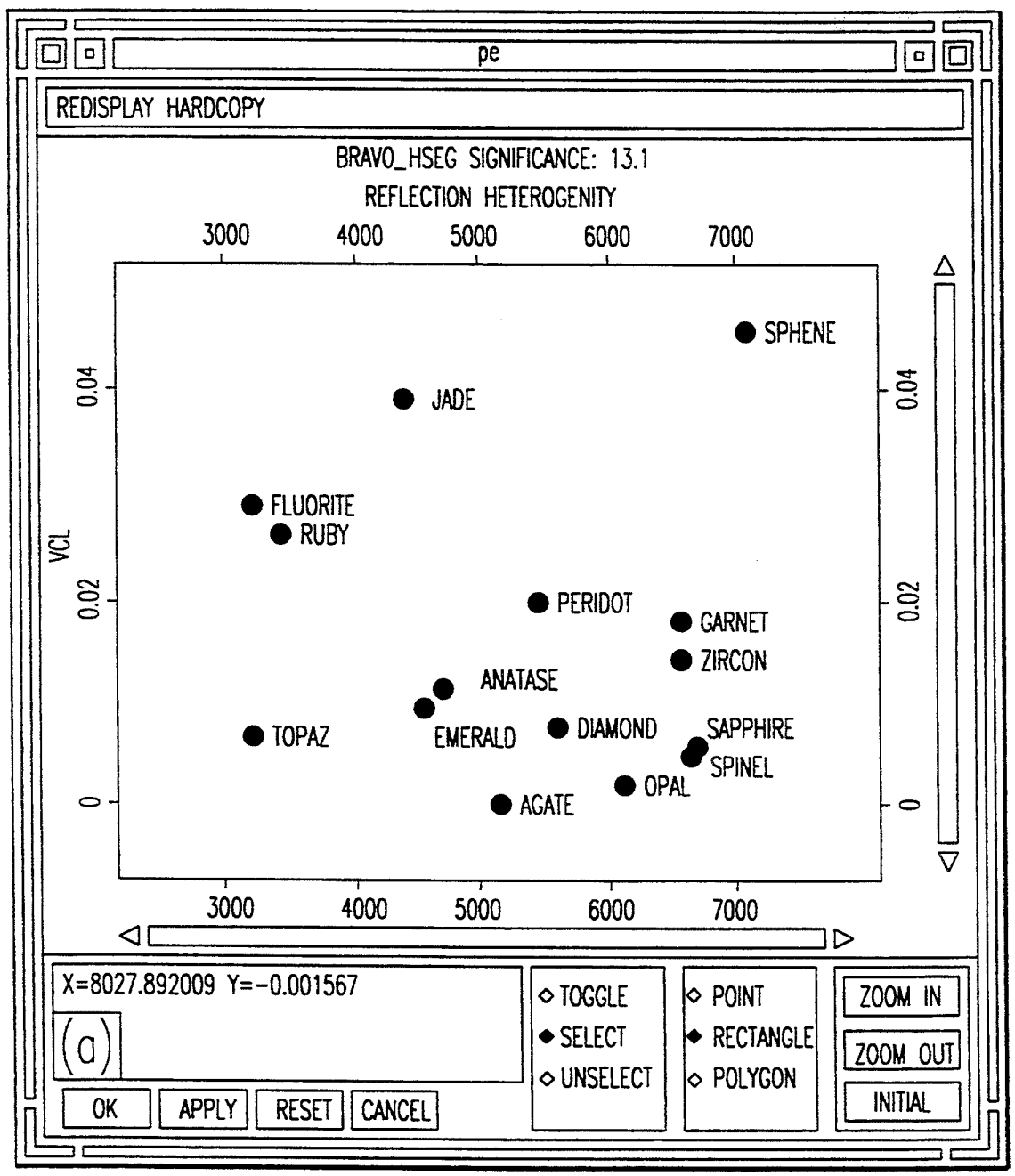
FIGS. 4(a) and (b) are graphs of clay volume versus reflection heterogeneity and seismic attribute, where 4(a) shows before and 4(b) after exclusion of out-liars.
Figure 4B:
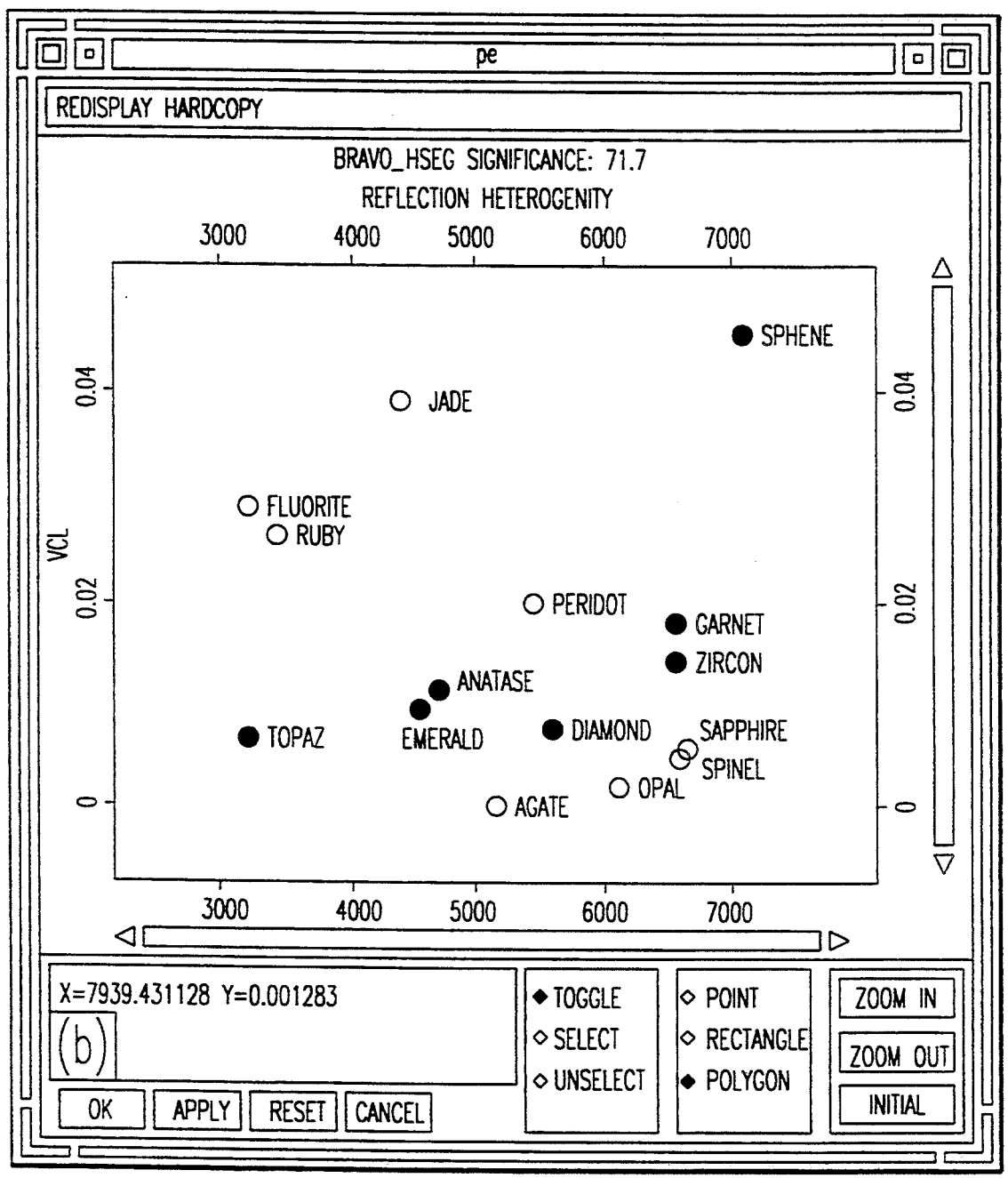

An interactive cross plot editor for a workstation is shown in FIG. 4. FIG. 4 illustrates specifically a technique for calibration editing. The names are well names. Volume of clay is expected to affect the Reflection Heterogeneity seismic attribute. (a) Before and (b) after exclusion of what might be interpreted as out-liars. The significance indicator increases from 13% to 72% in the process.

3) Modeling or Calibrating the relationship (linear and nonlinear)

To estimate a certain reservoir property, for example porosity, f, guided by velocity $V_p$, and shaliness, VCL, a calibration function $f(V_p, VCL)$ is sought. A linear calibration function is for example, $$\phi(V_p, VCL) = c_0 + c_1 \cdot V_p + c_2 \cdot VCL$$

where the coefficients, $c_0$, $c_1$ and $c_2$ are found by solving a system of equations. Linear calibration is adequate when the relations are linear. Nonlinear calibration is needed when the relations are more complex. For example, water saturation increases with depth nonlinearly; faster at the water cut and slower above and below it.

Figure 5:
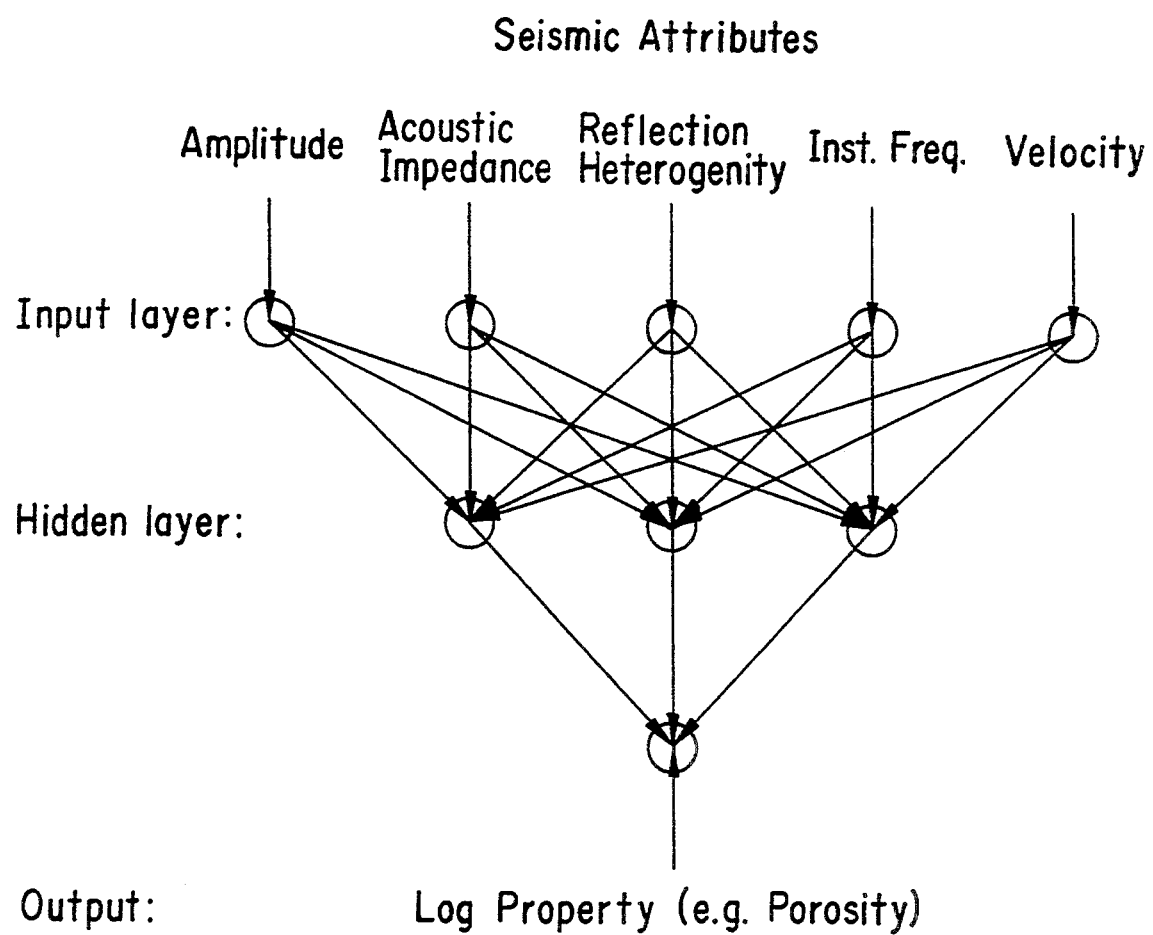
FIG. 5 is a graphical depiction of the Artificial Neural Network used in the calibration step of the present invention.
Figure 6A:
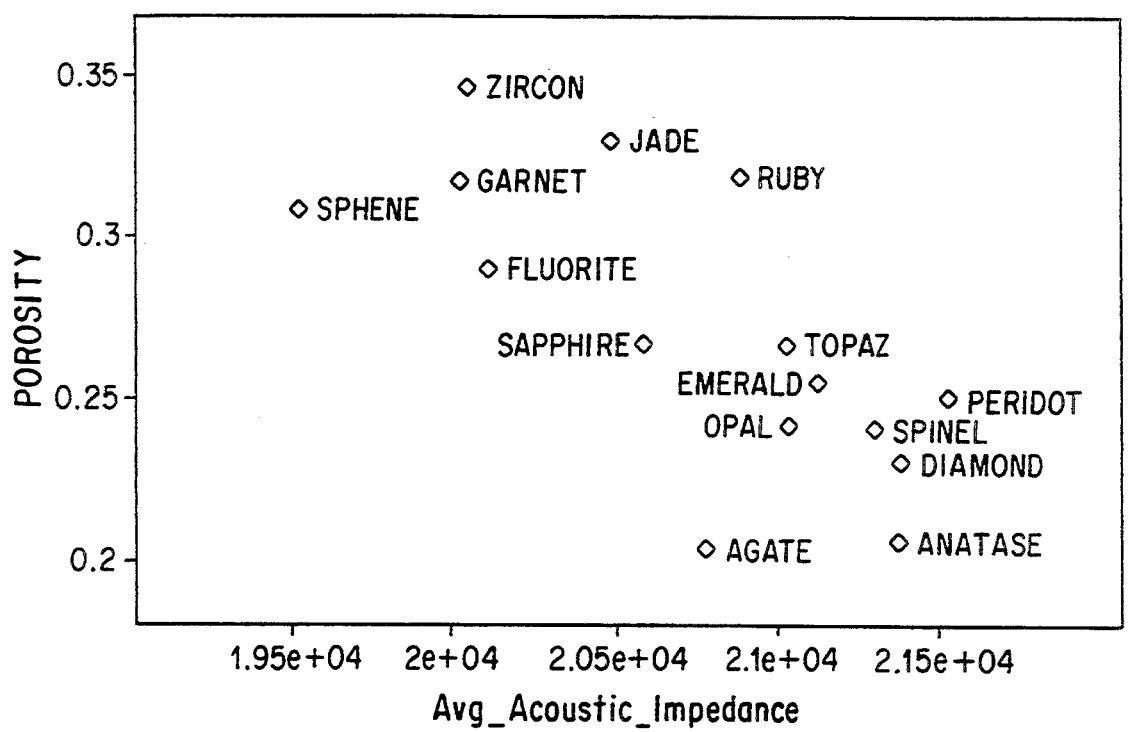
FIGS. 6(a)-6(f) are cross-plots leading to porosity estimation.
Figure 6B:
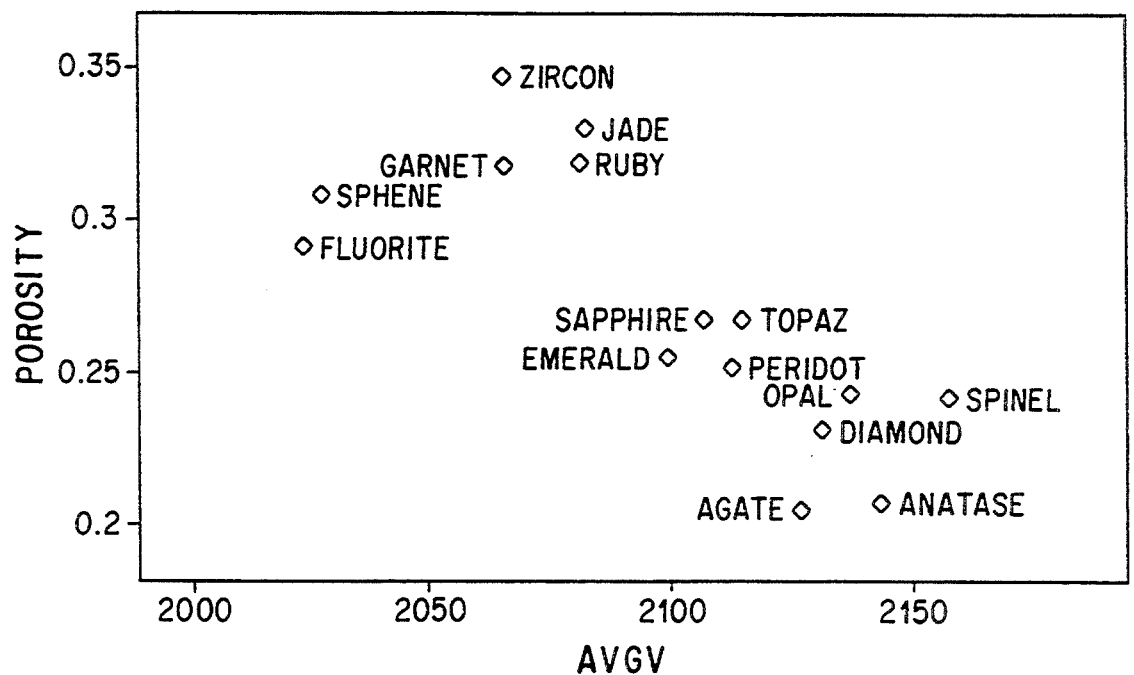
Figure 6C:
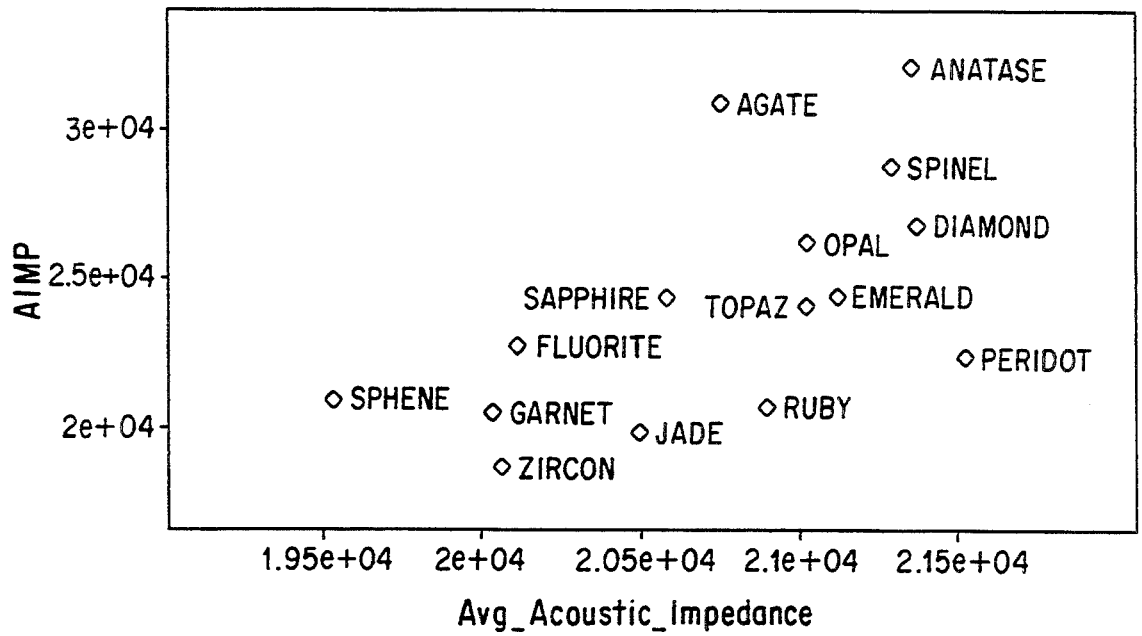
Figure 6D:
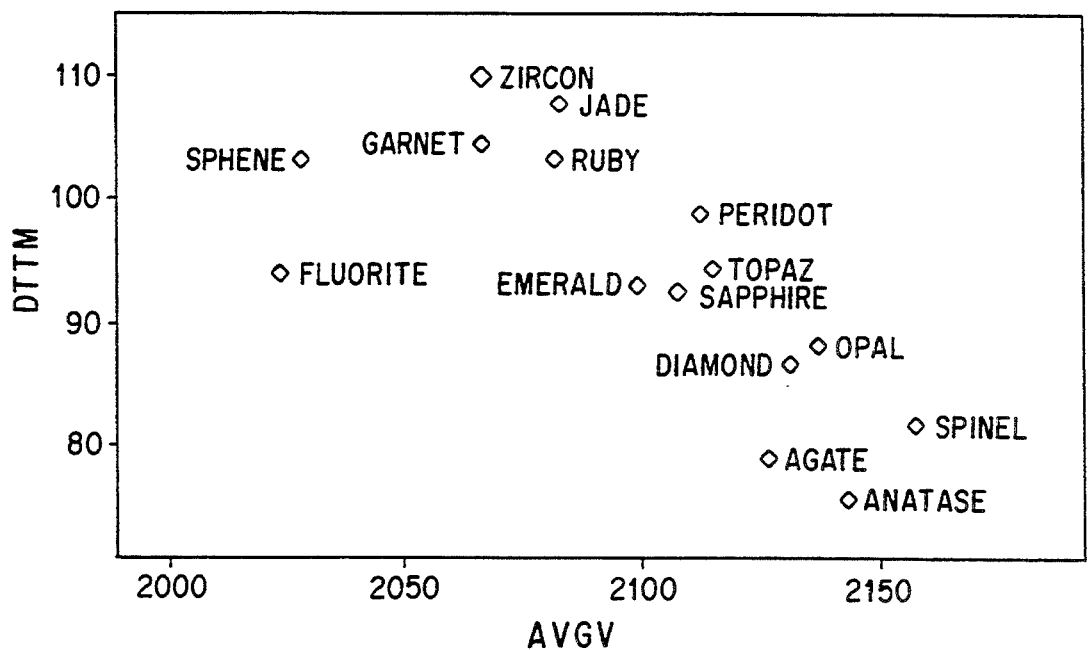
Figure 6E:
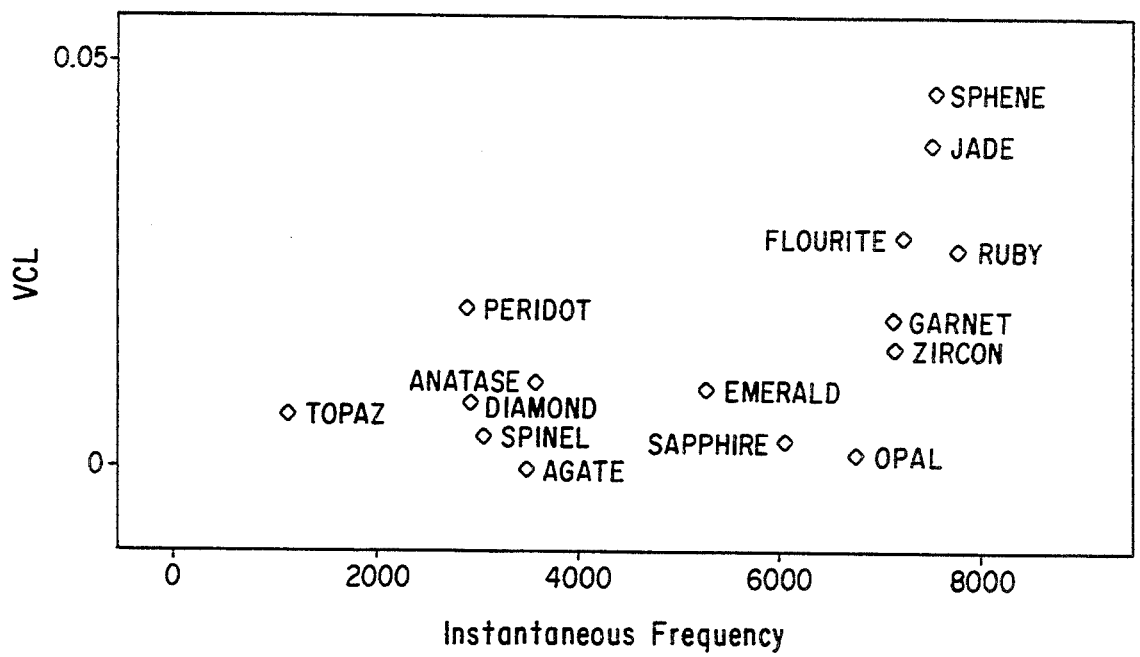
Figure 6F:
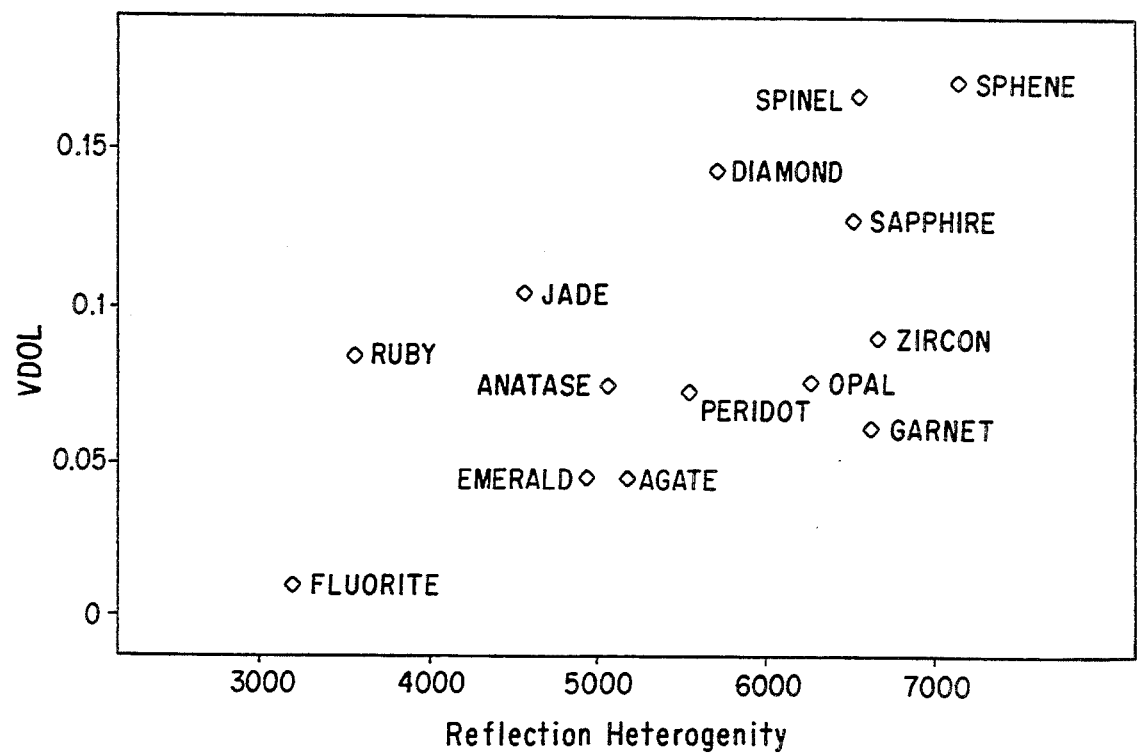

Since nonlinear relationships are unknown and varied, instead of prescribing a particular nonlinear model to perform the calibration (e.g., a polynomial typically used in regression), the method uses an artificial neural network (ANN) to learn a nonlinear model using example data (FIG. 5). The method perform the nonlinear calibration after the linear calibration using the difference (residuals) between the well-measured properties to the estimated properties from linear calibration.

The method uses a particular type of ANN, called a Radial Basis Function Network (RBFN). RBFN is a single hidden layer, feed-forward network that uses radially symmetric basis functions in the hidden layer, see, J. Moody, and C. Darken, 1989, Fast Learning in Networks of Locally-Tuned Processing Units, Neural Computation 1, 281–294. The RBFN is "trained" to approximate the unknown multivariate nonlinear target function using a weighted sum of basis functions. The method of the present invention uses the values of seismic attributes and wellbore properties, averaged about the intersections to "train" the network.

A hybrid learning procedure is used to train the ANN. First, the mean vectors of the RBF nodes are found using the K-means clustering algorithm (Spath, 1980). The cluster analysis yields cluster-averaged values and widths. The cluster width is the distance between the mean vector and the mean vector of the nearest cluster. Each cluster corresponds to a basis function that occupies a node in the hidden layer of the ANN. The width of each basis function is by default the width of the corresponding cluster. However, the nearest neighbor distance is multiplied by a user controlled overlap factor, in order to form a smooth contiguous interpolation over the input space. The approximation learned by the RBFN is given by:

$$r(A) = \sum_{j=1}^{n} w_j \cdot e^{-\|A-A_j\|^2/\sigma_j^2}$$

where r is the residual property to be estimated. A is the attribute vector, n is the number of hidden nodes, $w_j$ is the weight associated with the j-th hidden node, $A_j$ is the mean-cluster averaged attribute vector, and $\sigma_j$ is the extent of the response of the basis function. n and $\sigma_j$ are found in the cluster analysis but may be reset by the user. The weights $w_j$ are found using singular value decomposition to optimally fit the linear combination of basis functions to the residuals. Eventually, the basis function widths are determined iteratively by minimizing the approximation error.

This local nature of the fit makes the solution generated by the network clearly understood, unlike some other network models which follow a "black-box" approach with little user control. In addition, a fast training procedure is available to determine the network parameters.

As can be seen from FIG. 5, seismic attributes are the input layer. The hidden layer of a lesser number of nodes represents a set of Radial Basis Functions whose parameters are determined according to the well data. The output layer has a single node for the reservoir property which is predicted. The network parameters are found using the well data for training.

4.) Calculation of reservoir properties

After training, the network is used between wells for predicting reservoir properties where only seismic data exists. That is, the reservoir property at a location between existing oil wells is calculated using the trained ANN. The seismic attributes at the location(s) of interest is input to the trained ANN, with the reservoir property output (c.f. FIG. 5).

5. Residual correction and Confidence estimation

Reasonable calibration functions do not fit the intersection data exactly, implying that the estimates do not agree exactly with the borehole measurements. Often, an exact agreement will be a requirement, and may be handled by a residual correction. Geostatistical methods such as cokriging or gridding the differences between the calibrated attributes and the measured property are used to produce a seismic guided estimate that complies with the well data. See, G. Matheron, 1970, La theorie des variables regionalisees et ses applications, Tech. Rep. Fascicule 5, Les cahiers du centre de Morphologie Mathematique de Fontenebleau, Ecole Superieure des Mines de Paris and A. G. Journel and C. J. Huijbregts, 1978, Mining Geostatistics, Academic Press. These same geostatistical methods are used to estimate the confidence in the prediction of the reservoir property.

EXAMPLES

The following examples were performed on a reservoir modeling workstation, where functionality corresponding to the present method is implemented.

1. Porosity, impedance, velocity, and instantaneous frequency.

Rock physics predicts that porosity is related to velocity, acoustic impedance, and petrophysical components such as clay content, see, D. Marion, A. Nur, H. Yin, and D. Han, 1992, Compressional Velocity and Porosity in Sand-clay Mixtures: *Geophysics* 57, 554–563. A velocity model is required for imaging seismic data, and can also be used for estimating porosity. Acoustic impedance is calculated by inversion programs, and can be used in addition to or instead of velocity. Both velocity and acoustic impedance exhibit high significance to porosity (FIG. 6). The porosity values in FIG. 6 are purely from log data. The velocity (AVGV) and the acoustic impedance ($Avg_{13}$ $Acoustic_{13}$ Impedance) are calculated purely from seismic data. Hence, the significance numbers in FIG. 6 are indicative of the quality of the data acquisition, processing, and interpretation, in addition to the rock physics aspect of whether porosity is related to velocity and acoustic impedance. It is reassuring to see that acoustic impedance based on surface seismic data (called $Avg_{13}$ $Acoustic_{13}$ Impedance in FIG. 6) is indicative for the acoustic impedance based on borehole data (AIMP in FIG. 6).

The petrophysical composition is an important parameter in the porosity-impedance relations. One difficulty is in estimating the petrophysical composition. For example, volume of clay (shaliness, or VCL in FIGS. 6 and 4) and volume of dolomite (VDOL). Sometimes, petrophysical heterogeneity affects the Instantaneous Frequency and the Reflection Heterogeneity seismic attributes, because clay lenses or dolomite layers cause a high frequency reflectivity series. In FIG. 2, the volume of clay log (VCL) shows what looks like shaley lenses or layers. Indeed, the cross plots in FIG. 6 show a trend of increased instantaneous frequency and heterogeneity with increased volume of clay and dolomite.

FIGS. 6(*a*) and (*b*) show cross-plots leading to porosity estimation. In FIG. 6(*a*) porosity and acoustic impedance are inverted from seismic data; the trend of higher porosity with lower acoustic impedance is predicted by rock physics theory and laboratory measurements. FIG. 6(*b*) illustrates porosity and average velocity based on moveout velocity analysis. FIG. 6(*c*) shows a test for the quality of the seismic derived acoustic impedance; comparing the borehole based values to the surface based values of the same property. FIG. 6(*d*) is a test for the quality of the velocity estimation; comparing the average interval velocity from moveout analysis to the average sonic travel time-the higher the velocity, the shorter the travel time. FIG. 6(*e*) plots volume of clay and instantaneous frequency; high clay content values come from shale lenses that increase the instantaneous frequency. FIG. 6(*f*) compares volume of dolomite and heterogeneity; high dolomite content value indicate more dolomite layers which increase the Reflection Heterogeneity attribute.

Figures 7A, 7B:
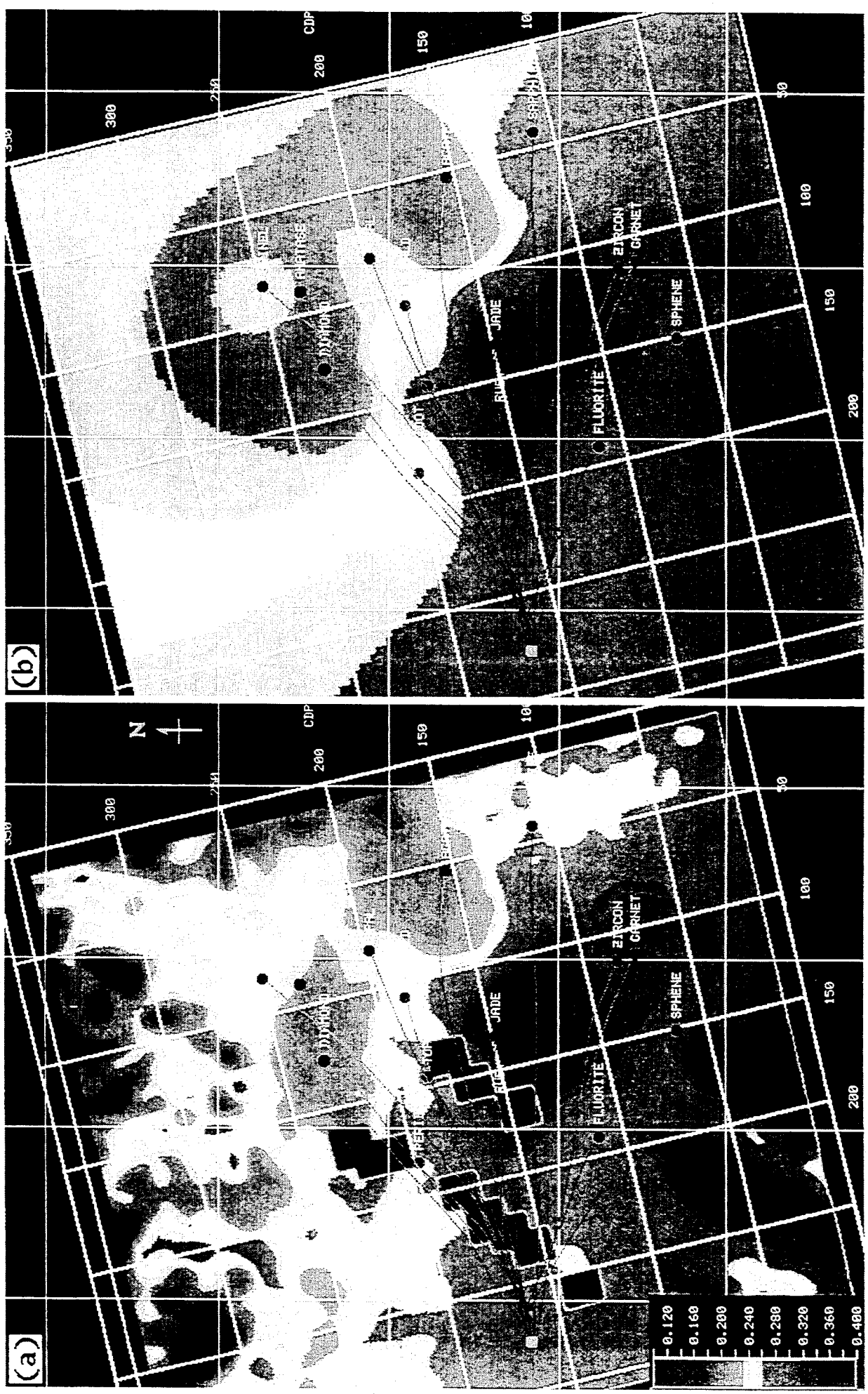
FIGS. 7(a) and (b) are graphs of porosity estimation where 7(a) is guided by acoustic impedance and volume of clay in accordance with the present invention and 7(b) depicts porosity interpolated from well logs without seismic guidance.

For comparison, estimates of porosity with and without seismic guidance are presented in FIGS. 7(*a*) and (*b*). FIG. 7(*a*) shows porosity estimation guided by acoustic impedance and volume of clay, using linear calibration while FIG. 7(*b*) shows porosity mapped from well logs without seismic guidance. Estimates in FIG. 7(*a*) and (*b*) agree exactly on the wells, but are quite different away from the wells. As can be seen, the FIG. 7(*a*) depiction of porosity with seismic guidance computed with the present method is qualitatively superior than FIG. 7(*b*).

2. Saturation and depth.

Figure 8:
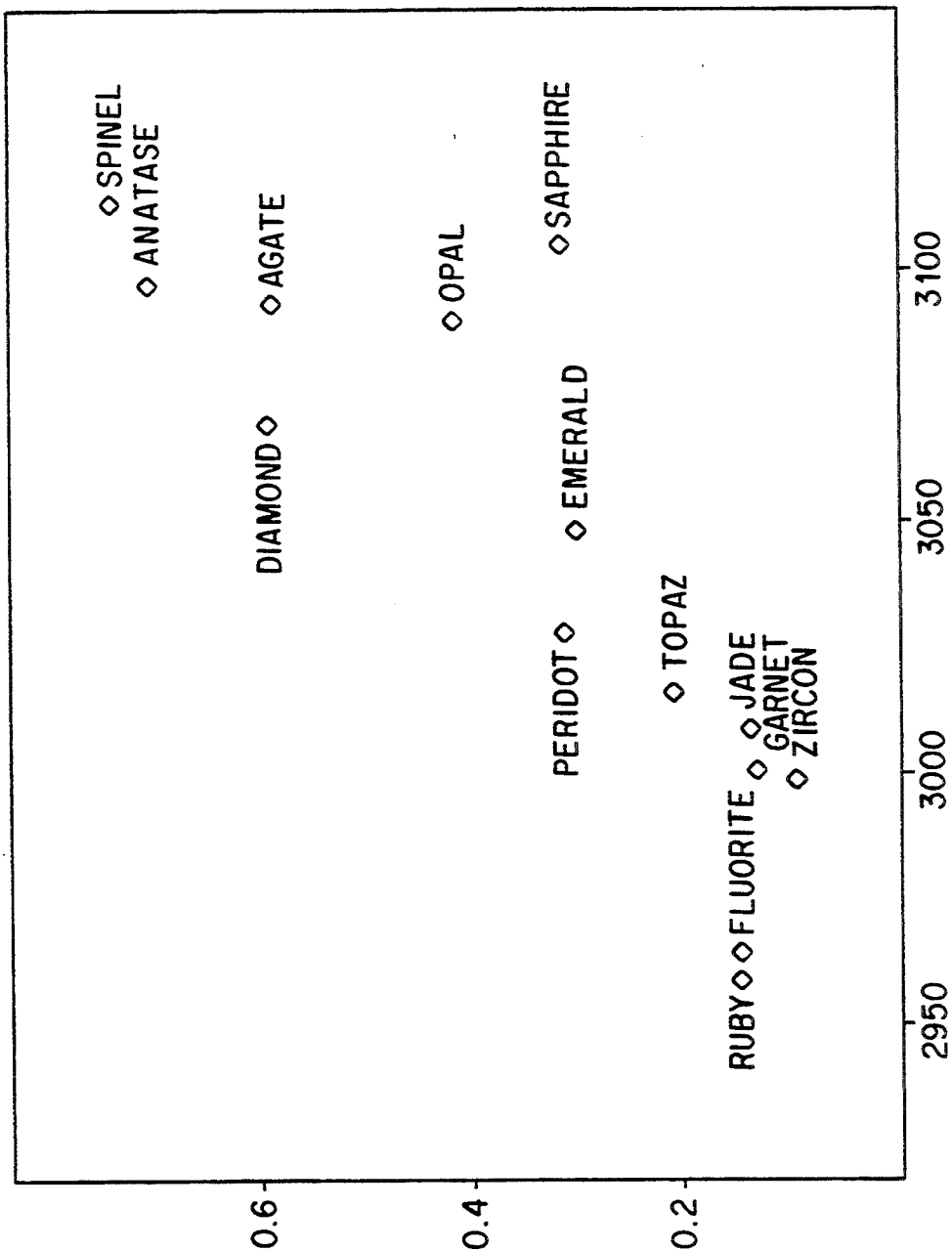
FIG. 8 is a graph of water saturation versus depth.

The depth map of a particular geological layer can be treated as an attribute. Such depth shows a correlation to water saturation, which is driven by gravity mechanisms (FIG. 8). FIG. 8 plots water saturation (SW) and depth. Within a hydro-carbon bearing reservoir component, the depth is significant for water saturation, as more water are in the deep and hydrocarbons on top. Arguably, one can see a water cut at about 3100 meters. One rarely sees a water cut on a single well water saturation log. However, the multi-well cross plot displays water saturation in an interval that spans nearly 200 meters, while a single well crosses a reservoir component in 5–40 meters as can be seen in FIG. 10.

Figure 9B:
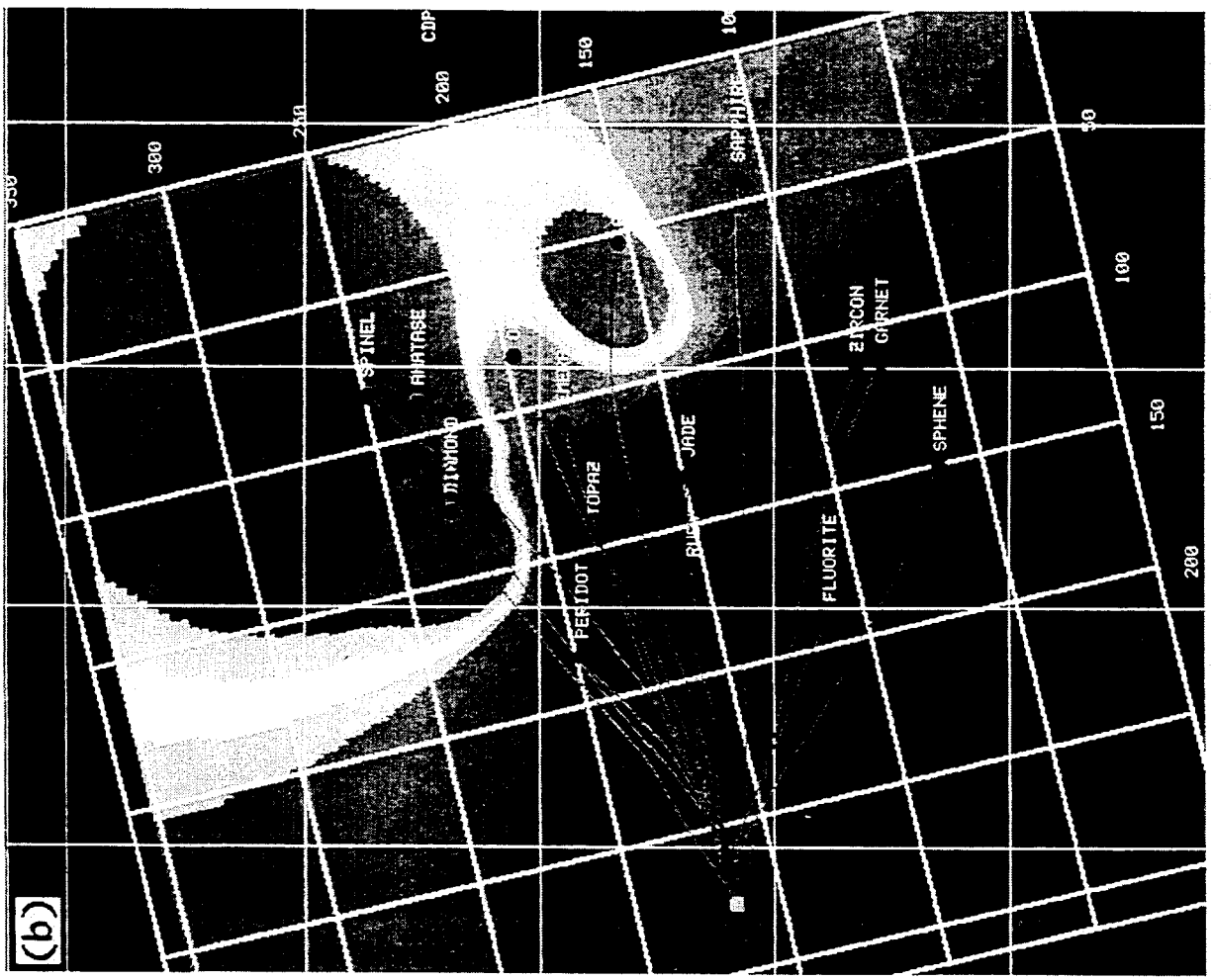
FIGS. 9(a) and (b) show water saturation prediction where
Figure 9A:
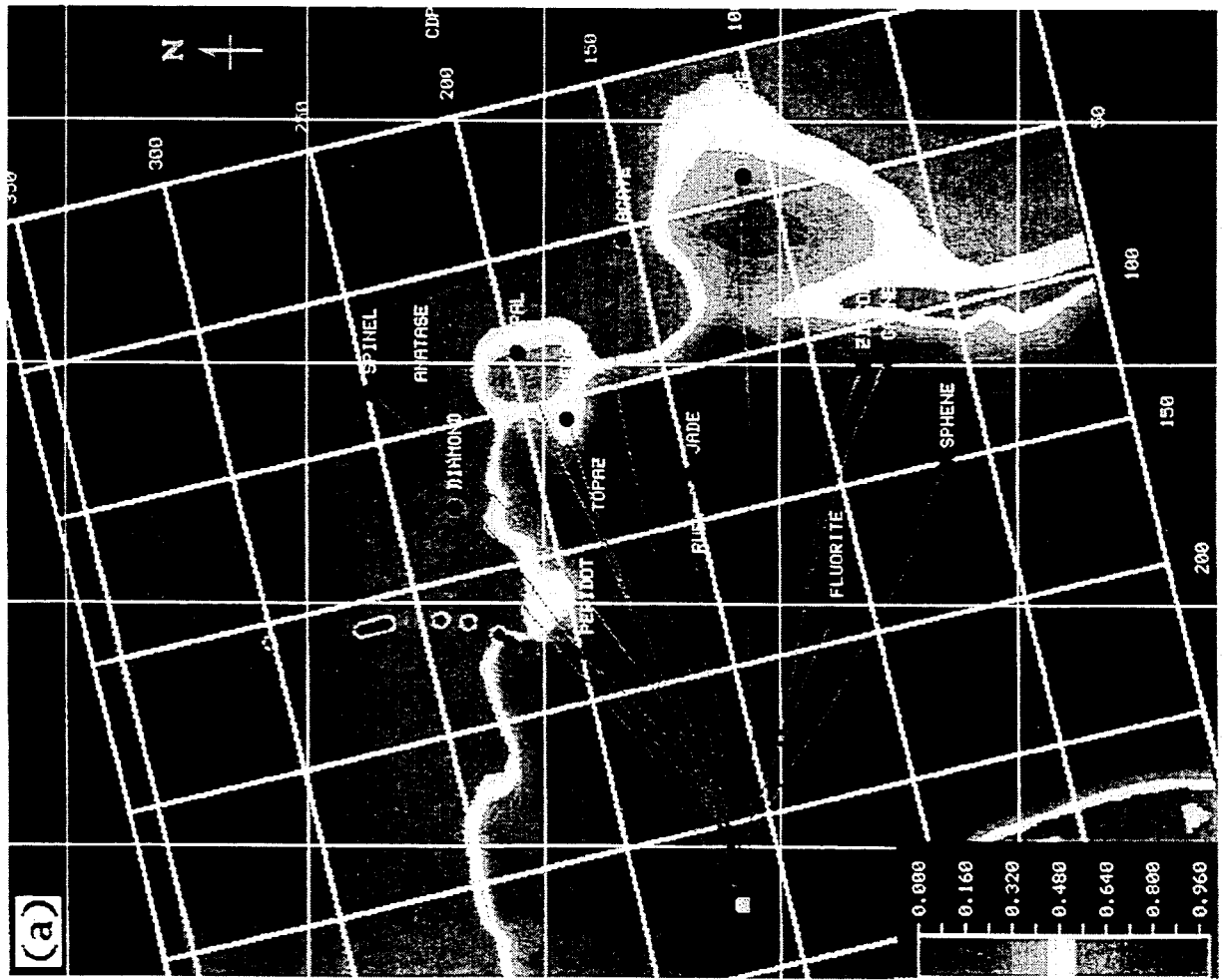

Water saturation mapping can be guided by depth as shown in FIG. 9. FIG. 9 illustrates water saturation estimation where FIG. 9(a) is guided by depth using an Artificial Neural network for nonlinear calibration and 9(b) is without seismic guidance. Estimations shown in FIG. 9(a) and (b) agree exactly on the wells but are quite different away from the wells. AVO indicators may be effective to estimate Gas saturation in a manner similar to FIG. 9.

3. Thickness and amplitude.

In thick reservoirs, the thickness can be obtained from tracking reflections. In thin reservoirs, reflection amplitude is affected by thickness tuning. See, A. R. Brown, R. M. Wright, K. D. Burkarl, and W. L. Abriel, 1984, Interactive seismic mapping of net producible gas sand in the gulf of Mexico, *Geophysics* 49, 686–714. To use thickness tuning, the reflection amplitude is used as a seismic attribute, and the well measured thickness is used as the reservoir property to be mapped. A cross plot of thickness versus amplitude is shown in FIG. 10. In FIG. 10, the amplitude is affected by the thickness because of interfering reflections from the top and the bottom of a component.

4. Permeability and viscosity.

Fluid and gas transmissibility are important reservoir properties, but seismic data are not directly affected by permeability and viscosity. Permeability is often proportional to porosity and this is, perhaps, why it seems to be related to seismic velocity. Seismic attenuation will be a useful attribute for the estimate of permeability distributions, see, N. Akbar, J. Dvorkin, and A. Nur, 1993, Relating P-wave Attenuation to Permeability, *Geophysics* 58, 20–29. When well log and core sample estimates of permeability are available, an effective match with seismic alternation is believed possible.

5. Dip and Azimuth.

Figures 11A, 11B:
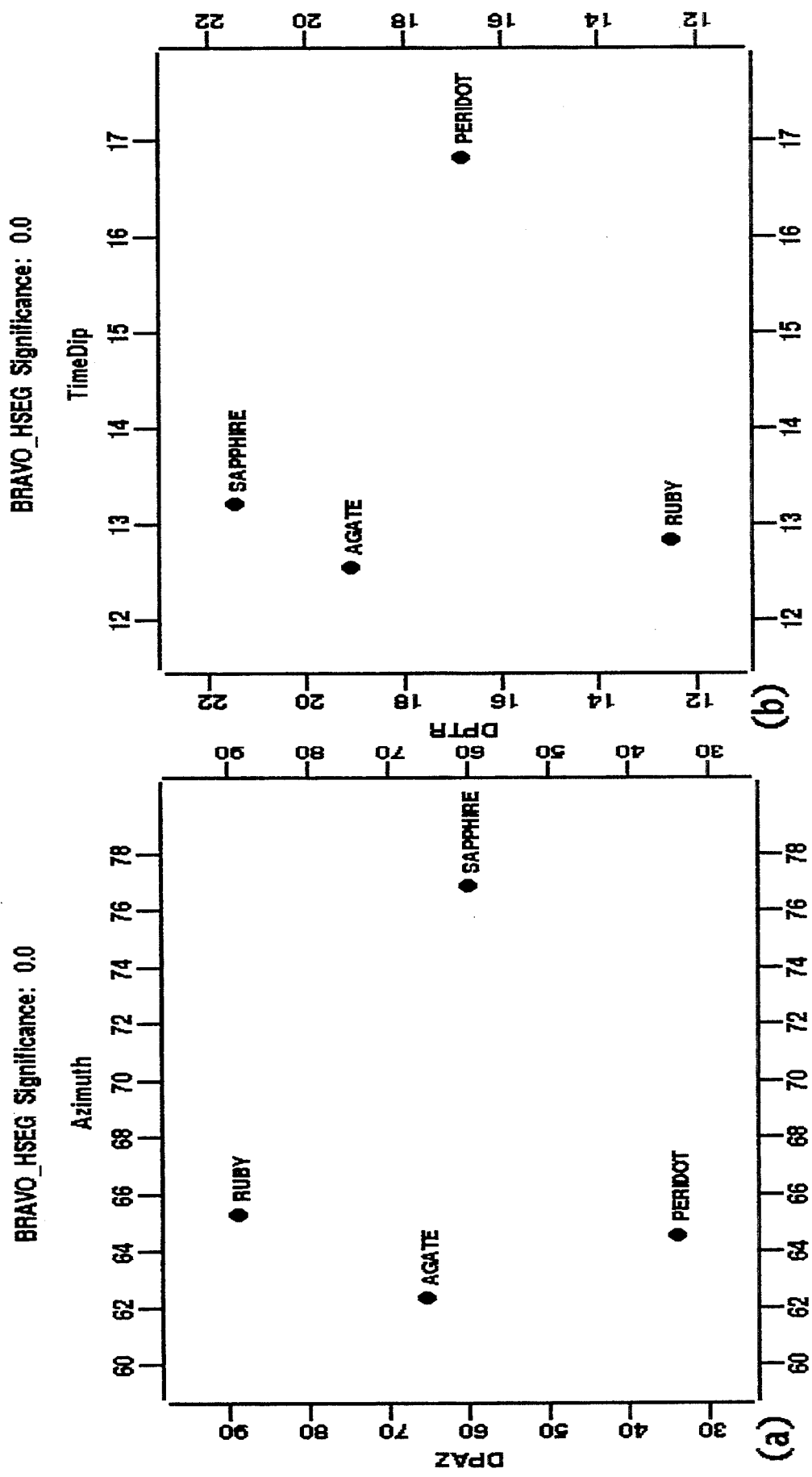
FIGS. 11(a) and (b) are graphs of borehole and seismic derived azimuth (a) and dip (b)
Figure 13:
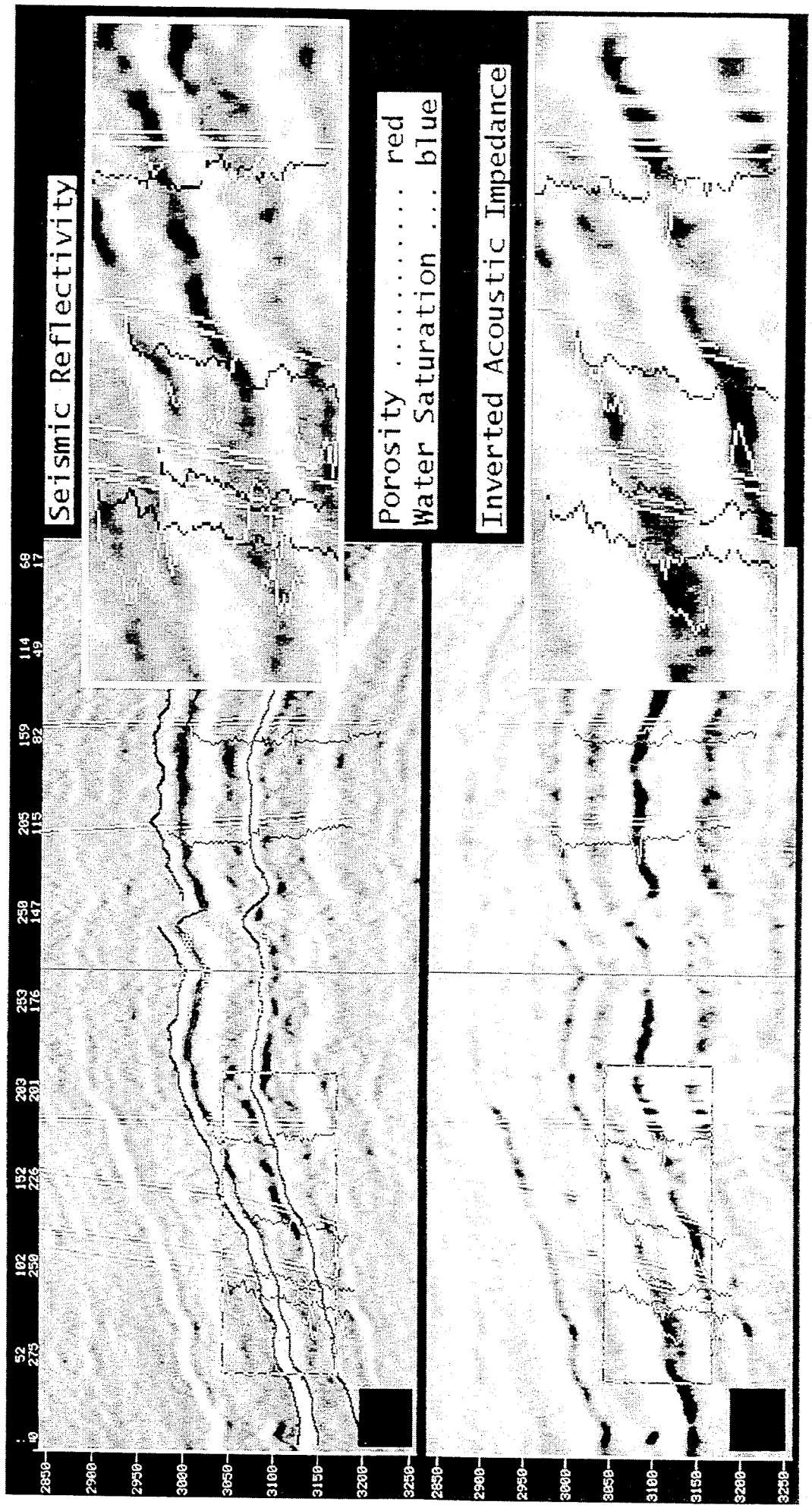
FIG. 13 is a cross section display of seismic data and acoustic impedance with porosity and water saturation logs with several wells projected on the cross section.

Attribute calibration offers an opportunity to compare estimations of dip and azimuth based on wellbore data to those based on surface seismic data. Dip and azimuth estimated from pure seismic data (by tracking a reflection) versus those estimated purely from wellbore data (by tracking resistivity with a formation microscanner) are shown in FIG. 11. In FIG. 10, the amplitude is affected by the thickness because of interfering reflections from the top and the bottom of a component. Unfortunately, the borehole dips and azimuths were acquired in only 4 wells which do not offer a sufficient sample, except to show that the results have the right order of magnitude for the azimuth, and that the dips from surface seismic data are underestimated, which might be due to underestimation of seismic velocity at the wells AGATE and SAPPHIRE.

6. Porosity Comparison.

The improvement in the reservoir property estimation by using seismic data is illustrated in FIG. 12. FIG. 12 illustrates the results of a controlled study where the porosity estimations with and without seismic guidance are illustrated. The control wells (not used in the estimations) are in yellow. Some wells are assigned as a validation group, then estimated porosity and Water Saturation without the validation wells, with and without seismic guidance, and compared seismic guided and unguided estimates to the measured values in the validation wells. Five examples were made that differ in the wells assigned as control wells.

The improvement in the accuracy of the estimates varied from −3% (the estimates without seismic guided were slightly more accurate) to a factor of 2.5 reduction in average error. The results in FIG. 12 indicate a significant improvement in the quality of the property estimates, when seismic data are used in accordance with the present invention. In this case the average absolute value of the error in estimating porosity was twice smaller when acoustic impedance was used to guide the estimate. The average error in estimating water saturation was 2.5 times smaller when the depth was used.

CONCLUSION

Better estimates of reservoir properties using seismic data are obtained using the method of the present invention. Statistical correlations between seismic attributes and log properties are identified, estimates of linear or nonlinear functional relationships between attributes and properties are made, an ANN is used for the nonlinear relationships, and these functional relationships are used to predict reservoir properties.

Seismic guided estimates have higher resolution and predict reservoir properties more accurately than estimates based on interpolation of well measurements on structures estimated from seismic data. This has been verified in a controlled study, in which some borehole data were withheld in the process and were later compared to the estimations with and without seismic guidance. For example, when acoustic impedance inverted from seismic data was used to guide estimation of porosity, the error was cut in half.

All patent references cited herein are incorporated by reference. All nonpatent references cited herein are incorporated by reference for background.

We claim:

1. In a digital computer, a method for predicting oil reservoir properties using one or more types of seismic data for the reservoir and one or more types of wellbore data for one or more oil wells in the reservoir, comprising the steps of:
   a) relating the seismic data to the wellbore data for at least one oil well to determine the approximate intersections of the seismic and wellbore data;
   b) estimating a significance of a match of one or more types of said seismic data to a type of wellbore data using said intersections to determine nonrandom matches between seismic data and wellbore data;
   c) calibrating the relationship between seismic data and wellbore data by training an Artificial Neural Network (ANN) using one or more of said nonrandom matches; and
   d) predicting a reservoir property using said trained ANN based on seismic data.

2. The method of claim 1, including the step of determining the confidence level of the calculated reservoir property.

3. The method of claim 1, where said estimating step b) determines nonrandom matches between a plurality of types of seismic data to a single type of wellbore data.

4. The method of claim 1, where the seismic data is a seismic attribute, the types of seismic data including acoustic velocity, acoustic impedance, and amplitude versus offset.

5. The method of claim 1, where the types of wellbore data includes porosity, saturation, permeability, and dip and azimuth.

6. The method of claim 1, where the predicted reservoir property is porosity using said trained ANN based on acoustic velocity seismic data.

7. The method of claim 1, where the predicted reservoir property is water saturation using said trained ANN based on depth as a type of seismic data.

8. The method of claim 1, where the seismic data is related to a wellbore data for a plurality of oil wells of said oil reservoir.

9. The method of claim 1, where the Artificial Neural Network is a radial basis function network.

10. The method of claim 1, including the step c) of calibrating the relationship between seismic data and wellbore data using a linear calibration function where the relationship between the seismic data and wellbore data is linear.

11. The method of claim 1, where the relating step a) comprises relating seismic reflectors to geological markers in the wellbores.

12. The method of claim 1, where the relating step a) further comprises matching seismic reflectors to geological markers in a borehole.

13. The method of claim 1, wherein said estimating step b) includes calculating the probability of a match using a Kendall tau indicator.

14. The method of claim 1, wherein said calibrating step c) further comprises training said ANN using said seismic data as inputs to the ANN and said wellbore data as output from said ANN.

15. The method of claim 1, wherein said predicting step d) includes the substeps of
inputting reservoir seismic data from locations spaced from said oil wells in the reservoir into said trained ANN,
outputting wellbore data from said trained ANN indicative of said oil reservoir property.

16. In a digital computer, a method for predicting a reservoir property using seismic attributes for the reservoir and wellbore data from one or more oil wells in the reservoir comprising the steps of:
a) determining significant nonrandom matches between types of seismic data and types of wellbore data;
b) modeling a relationship between a significant match using an Artificial Neural Network (ANN) trained with some of said significant matches; and
c) predicting a reservoir property spaced from said oil wells using said trained ANN with one or more seismic attributes as input to said trained ANN.

17. The method of claim 16, wherein said determining step a) includes the substep of calculating the probability of said significant matches using a Kendall tau indicator.

18. The method of claim 16, wherein said modeling step b) includes a radial basis function ANN trained with seismic attributes from said significant matches as inputs and corresponding wellbore data from said significant matches as outputs.

19. The method of claim 16, wherein said predicting step c) includes the substeps of outputting wellbore data as indicative of said reservoir property.

20. The method of claim 12, in said relating step a) said geological markers being a function of depth and said seismic reflectors being a function of time.

* * * * *